United States Patent [19]

Johnson, Jr. et al.

[11] Patent Number: 4,563,907

[45] Date of Patent: Jan. 14, 1986

[54] DIRECT READING AUTOMATIC PIPETTE

[75] Inventors: Edgar G. Johnson, Jr., Huntsville; James J. Cornelison, Gurley; Paul V. Mackovjak, Huntsville, all of Ala.

[73] Assignee: Micromedic Systems Inc., Horsham, Pa.

[21] Appl. No.: 546,796

[22] Filed: Oct. 31, 1983

[51] Int. Cl.[4] .................... G01N 1/14

[52] U.S. Cl. .................... 73/864.16; 422/100

[58] Field of Search .................... 73/3, 149, 239, 240, 73/250, 863.02, 864.02, 864.16, 864.18; 422/100, 64; 141/94, 95

[56] References Cited

U.S. PATENT DOCUMENTS

| | | | |
|---|---|---|---|
| 1,736,392 | 11/1929 | Coss et al. | 73/864.16 X |
| 3,146,620 | 9/1964 | Morrill, Jr. | 73/3 X |
| 3,657,925 | 4/1972 | Gross | 73/239 |
| 3,699,348 | 10/1972 | Hocherl | 73/864.16 X |
| 3,766,785 | 10/1973 | Smernoff | 73/864.16 X |
| 3,810,391 | 5/1974 | Suovaniemi | 73/864.18 |
| 3,915,651 | 10/1975 | Nishi | 73/864.16 |
| 3,991,616 | 11/1976 | Stahli | 73/864.16 X |
| 4,058,370 | 11/1977 | Suovaniemi | 73/864.16 X |
| 4,331,262 | 5/1982 | Snyder et al. | 73/3 X |
| 4,345,483 | 8/1982 | Paletta et al. | 73/864.16 |
| 4,346,742 | 8/1982 | Chase et al. | 73/864.16 X |
| 4,369,665 | 1/1983 | Citrin | 73/864.18 |
| 4,399,710 | 8/1983 | Klein | 73/864.16 |
| 4,399,712 | 8/1983 | Oshikubo et al. | 73/864.16 |
| 4,463,603 | 8/1984 | Welker | 73/239 |
| 4,476,999 | 10/1984 | Bilbrey | 73/864.16 X |

FOREIGN PATENT DOCUMENTS

| | | | |
|---|---|---|---|
| 2202121 | 7/1973 | Fed. Rep. of Germany | 73/864.16 |
| 2381996 | 10/1978 | France | 73/864.16 |

*Primary Examiner*—Robert Spitzer
*Attorney, Agent, or Firm*—Alex R. Sluzas

[57] ABSTRACT

This invention is directed to an automatic pipette which directly detects the volume of an inserted syringe, thus eliminating the need for operator specification of this quantity.

7 Claims, 3 Drawing Figures

DIRECT READING AUTOMATIC PIPETTE

BACKGROUND OF THE INVENTION

1. Field of the Invention

The present invention relates to an automatic pipette and more particularly an improved automatic pipette which directly detects the volume of an inserted syringe, thus eliminating the need for operator specification of this quantity.

2. Brief Description of the Prior Art

Automatic pipettes and diluters are well known in the chemical analysis art and in the medical laboratory analysis art. Automatic pipettes are used to repetitively deliver precise quantities of reagents. Where many samples must be analyzed, or where many repetitions of a single analysis must be made for statistical purposes, manual pipetting is less desirable than automatic delivery of precise reagent volumes. Automatic pipetting reduces errors associated with analyst fatigue, perception and technique. The advantages of automatic pipetting and dilution over manual methods become even more significant when micro quantities of reagents must be used in analysis.

Automatic pipettes typically employ the controlled advance of a plunger through a syringe barrel to achieve the metered delivery of fluid. In an automatic pipette the operator typically presets the amount of fluid to be delivered, and the pipette itself controls the advancement of the plunger through the syringe barrel. This may be through a stepping motor and screw mechanism and associated control means. For example, in U.S. Pat. No. 3,915,651, granted Sept. 22, 1972 to H. H. Nishi, the plunger is connected to a micrometer screw which is rotated by a stepping motor. The Nishi pipette is controlled by an electronic indexer which is present by the operator to define the number of increments through which the motor is stepped. The same function can be performed by a microprocessor.

Motor-driven automatic pipettes may deliver fluid or fluids from two or more syringes simultaneously. This may be accomplished using separate stepping motors, control circuits, et al. for each syringe. The syringes themselves may be different in size. Sequential delivery from two or more different syringes may also be accomplished. In addition, fluid may be delivered from one syringe into another partially filled with a second fluid in order to dilute the first fluid. The diluted fluid in the second syringe may subsequently be delivered to an external receptacle.

An alternative to the motor-driven automatic pipette is the manual automatic pipette. In the manual automatic pipette the operator effects filling and delivery from the pipette, typically by depressing and releasing a thumb-operable button. The pipette is automatic in the sense that the operator need not visually confirm the volume taken up and delivered by the pipette as in manual pipetting. The pipette may permit the operator to vary the stroke of the piston, in order to vary the volume delivered, as in U.S. Pat. No. 3,766,785. However, the manual type of automatic pipette is generally manufactured to repetitively deliver only a standard single volume of fluid and the volume to be delivered is not quickly altered. Because "automatic pipette" is used in the art to refer to both manual and motor-driven pipetting devices, the latter device may be referred to as a motor-driven automatic pipette.

It is advantageous that the syringe barrel and plunger combinations of different total volume displacements be available for use in an automatic pipette. This is because the precision of fluid delivery depends upon the minimum amount which the syringe piston must be displaced within the syringe barrel. This, in turn, is typically limited by the minimum increment of the control and stepping motor and the fineness of the screw thread through which the syringe piston is advanced. The volume displaced by the syringe is related to the axial displacement of the syringe piston by the cross-sectional area of the syringe barrel. By using syringe barrels of different cross-sectional area, that is, different size syringes, the minimum volume delivery increment and the precision of delivery can be altered to suit the task at hand.

Typically, a motor-driven automatic pipette is preset by the operator to the volume to be delivered. In order for the pipette to compute the plunger displacement required to achieve the desired delivery volume, the cross-sectional area of the syringe barrel which is actually in place in the pipette must be made known to the pipette. One way in which this information can be made available to the pipette is for the operator to input this information at the time a syringe barrel and plunger is fitted to the pipette. A variety of different methods may conceivably be used to transfer this information at that time. For example, a switch characteristic of syringe size may be physically set by the operator. Whatever conventional method is adopted, the fact that syringe size is selected by the analyst introduces an opportunity for operator error into the analytical task. For example, the switch, referred to above, may not be accurately set initially, possibly necessitating extensive retesting. In medical laboratory analysis especially, where sample volumes may be very small and acquired under difficult-to-reproduce conditions, it is desirable to eliminate as far as possible all sources of operator error in analytical procedures.

Thus, one of the objects of this invention is to reduce the amount of information which an operator of an automatic pipette must input when a new interchangeable syringe assembly is installed. Another object of the invention is to eliminate the possibility of operator error in inputing the volume which characterizes one of a series of interchangeable syringe assemblies for an automatic pipette when installing a new assembly in the pipette. Another object of this invention is for the pipette to automatically indicate, without operator intervention, the effective volume of one of a series of interchangeable syringe assemblies in a motor-driven automatic pipette. These and other objects of the present invention will become apparent to one skilled in the art in the following description of the invention and its preferred embodiment.

SUMMARY OF THE INVENTION

The present invention relates to an improvement in an apparatus for dispensing and/or diluting metered amounts of fluid. The apparatus is capable of using interchangeable syringe assemblies, each assembly having a different effective delivery volume. The apparatus may optionally be fitted with more than one syringe assembly of different volumes at the same time. The apparatus may be hand operable or motor-driven. The improvement of this invention is an indicator on each of the assemblies for signaling the effective delivery volume of each to the apparatus and a reader on the apparatus for automatically reading the indicators on the assemblies. The apparatus for dispensing and/or diluting metered amounts of fluid may be microprocessor controlled. The program and/or programs controlling the microprocessor may be stored by any combination of hardware, firmware or software.

It is preferred that the syringe assembly be composed of a syringe barrel, a syringe piston, and an adapter, wherein the adapter connects the piston with driving means, such as a stepping motor and an associated drive train, for axially displacing the piston within the barrel. Further, the preferred embodiments are those wherein a maximum axial displacement of the piston within the barrel outward from the fluid inlet end of the barrel indicate the effective volume of the syringe assembly. Axial displacement of the piston within the syringe assembly may be effected as by a stepping motor connected through a drive shaft or other means, the driving means being connected to the syringe assembly by the adapter. The driving means may consist of a drive shaft which is connected to the stepping motor through a finely-pitched screw and nut assembly whereby rotation of the stepping motor rotates the screw. The screw may be rigidly attached to the stepping motor or may be attached through a clutch. The drive shaft may be connected to the nut such that axial displacement of the nut along the screw simultaneously displaces the drive shaft. Displacement of the drive shaft may be effected by any of the conventional means of displacing an automatic pipette piston or plunger known in the art; for example, as in U.S. Pat. Nos. 3,915,651, 3,991,616 or 4,346,742.

It is preferred in the dispensing and/or diluting apparatus that the adapter extend in at least one direction perpendicular to the direction of axial piston displacement, beyond the outer surface of the drive shaft in the perpendicular direction, such that at maximum outward displacement of the piston, the adapter contacts a switch activator. In a preferred embodiment, the adapter uniformly extends radially substantially beyond the outer surface of a cylindrical drive shaft. The adapter may be a cylindar with a radius greater than that of the drive shaft. Alternatively, the adapter may be such that only a portion of the adapter extends beyond the drive shaft's outer surface.

The adapter may thus operate as a trip lever which signals the maximum outward displacement of the piston within the barrel of the syringe assembly through the action of switch activator to a controller such as a microprocessor.

In a preferred embodiment, the switch activator may be a lever which when contacted by the adapter extension revolves about its fulcrum such that the lever contacts a microswitch, thereby altering the electrical state of the microswitch. In an alternative embodiment, the switch activator may comprise an element of a microswitch itself such that the adapter directly contacts the microswitch.

The switch activator may be any activator conventionally known in the mechanical or electrical arts to activate a mechanical, electrical or photoelectric switch or sensing element. For example, the switch activator may comprise a photoelectric cell, light source and associated circuitry and optical elements such that the adapter interrupts a light beam extending from the light source to the photocell at maximum outward displacement of the piston.

It is preferred when a stepping motor is used that the dispensing and/or diluting apparatus additionally include a counter or other recording means for counting the number of steps by which the stepping motor is incremented. This counter means may also be a register or memory location of a microprocessor which is programmed to count the number of times it commands the stepping motor to increase or decrease one step. Further, it is preferred that the dispensing or diluting apparatus have the capability of detecting the maximum inward displacement of the syringe piston within the assembly. This may be accomplished by fitting the apparatus with an additional detector for sensing the maximum inward displacement of the adapter. Alternatively, the detection of maximum inward displacement need not employ the adapter. Where the driver means includes a drive screw and nut in the drive train, a trip lever may be attached rigidly to the drive screw nut whereby the trip lever contacts a switch permanently yet adjustably mounted on the apparatus body at a displacement along the screw which corresponds to the maximum inward displacement of the piston for each of the syringe assemblies. On the other hand, the maximum inward displacement may depend on the identity of each of the syringe assemblies and consequently may be detected individually through optical and mechanical means for each.

It is preferred that the diluting or dispensing apparatus additionally include means for clearing the counter used to count the number of steps which the stepping motor is incremented. This may be accomplished by clearing a microprocessor register or program storage location corresponding to the counter upon detecting a signal corresponding to maximum inward piston displacement.

It is also preferred that the dispensing and/or dilution apparatus contain a storage means for storing maximum step numbers corresponding to different syringe volumes. These step numbers may be obtained empirically by stepping the stepping motor under manual or program control with the syringe assembly, whose volume is to be determined, installed in said apparatus, such that a precisely known volume of fluid is drawn into the syringe barrel. Alternatively, the maximum displacement volume of the syringe can be obtained by trial and error. For example, the syringe piston may be stepped down in an arbitrary number of steps and the volume delivered corresponding to said number may be determined gravimetrically, given a fluid with a known density. The maximum step numbers will depend on the axial displacement which the adapter undergoes as the syringe piston and adapter are displaced from the maximum inward piston displacement to the maximum outward piston displacement, and the position of the maximum extension switch activator relative to the maximum outward piston displacement. The axial displacement which the adapter undergoes as the syringe piston is displaced from its maximum inward position to its maximum outward position may be the same for syringe assemblies having different volumes because the interior diameter of the syringe barrels may differ. Thus, the distance corresponding to the difference between maximum and minimal axial displacement may not uniquely characterize syringe volume. However, in this case, syringes of different volumes may be uniquely identified by altering the position of the adapter such that the number of steps required to travel outward until the maximum extension switch activator is contacted is different for each syringe assembly.

A table containing the number of steps corresponding to each syringe volume may be stored in the microprocessor. When the maximum extension signal is received by that microprocessor, it compares the contents of the register or memory location containing the number of steps which the number of steps the stepping motor has increased as it outwardly displaced the piston, with the values in the table, in order to determine syringe volume.

The preferred microprocessor controls the axial piston displacement, detects the maximum outward and inward piston displacement, stores maximum step numbers, compares the maximum step numbers with the contents of the counter means, and consequently determines the syringe assembly identity and volume.

DESCRIPTION OF THE PREFERRED EMBODIMENT

Figure 1:
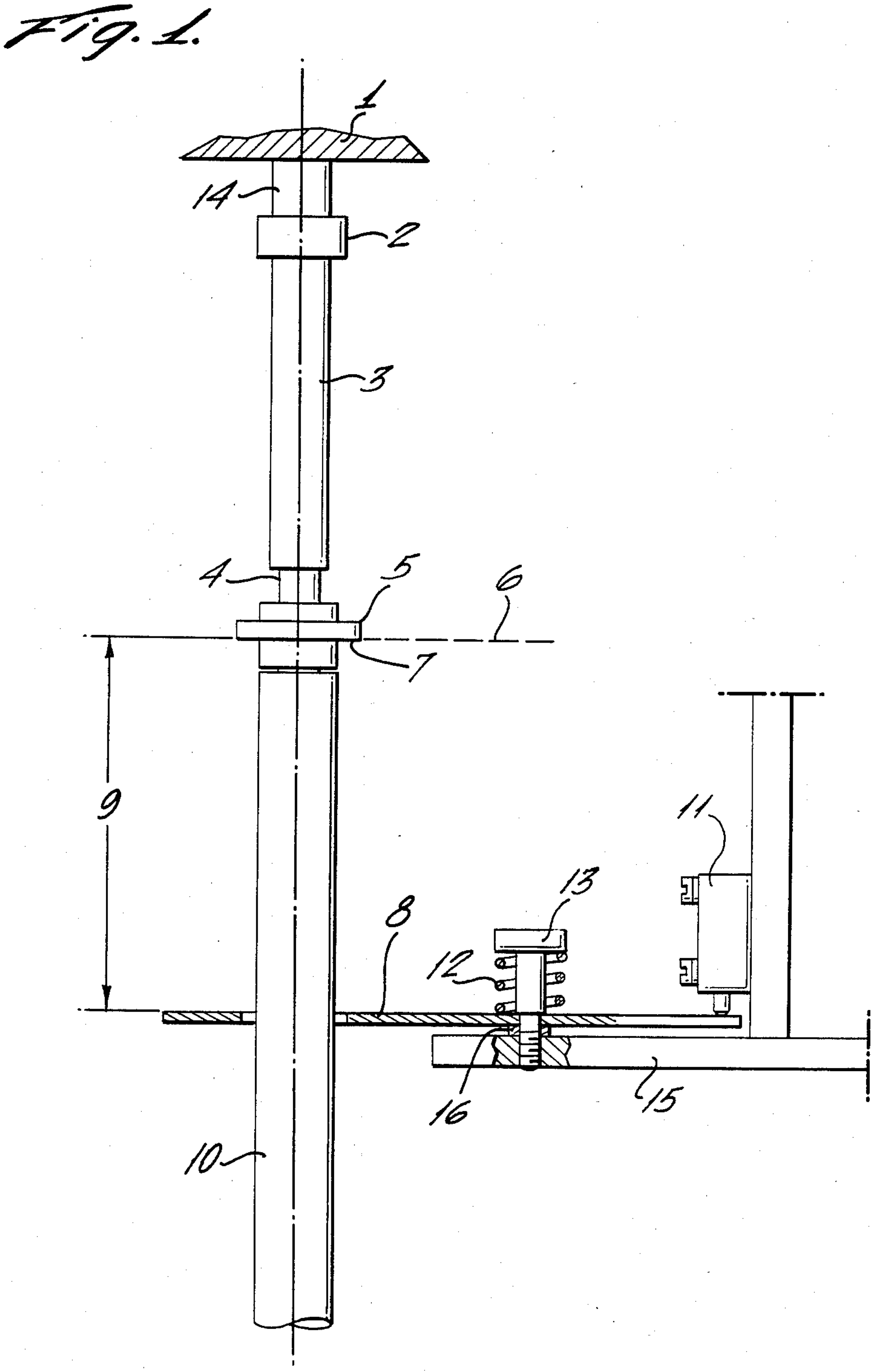
FIG. 1 is a schematic elevation illustrating a preferred embodiment of the invention.

A preferred embodiment of the present invention is described by reference to FIG. 1. The syringe barrel 3, which is preferably a precision bore glass barrel, is attached to the body of the automatic pipette 1 through connector 2, which may be quick-connect, twist-and-lock fitting. The connector tightly seals the syringe barrel to the pipette body, yet permits the unimpeded flow of fluid between the syringe and the remainder of the apparatus. The pipette body 1 includes a valve assembly 14, to which intake and outflow fluid (not shown) lines are connected, and which controls the inflow and outflow of fluid in and out of the syringe barrel 3. The outflow fluid line may be directed to an external receptacle. Alternatively, the outflow fluid line may be connected to the intake valve corresponding to a second syringe assembly. Each syringe barrel 3 is fitted with a tightly fitting piston 4. Fluid flows into and out of the syringe barrel when the syringe piston 4 is displaced axially out of and into the syringe barrel 3 respectively. The syringe piston 4 is connected at its furthest outward extension to drive shaft 10 by syringe adapter 5. Reference plane 6 is defined by the lower surface of the projection of the adapter 5, normal to the direction of axially displacement of the syringe piston, beyond the outer diameter of the drive shaft 10 when syringe piston 4 is at the limit of its maximum inward travel within syringe barrel 3.

Displacement 9 represents the axial displacement which the adapter 5 and piston 4 travel between the maximum inward piston position and the maximum outward syringe piston position. At the maximum outward syringe position the adapter 5 contacts a switch activator 8. The switch activator 8 is fixed to the apparatus body 15 by a screw 13 which may be biased by a return spring 12 so as to return the activator 8 to a position perpendicular to the axial travel of the drive shaft 10 when the switch activator 8 is not in contact with the adapter 5. When the adapter 5 contacts the switch activator 8, the switch activator 8 rotates as a lever on a washer 16 and alters the electrical state of a microswitch 11 connected to the switch activator. The altered state of the microswitch 11 is sensed by a microprocessor (not shown).

Figure 2:
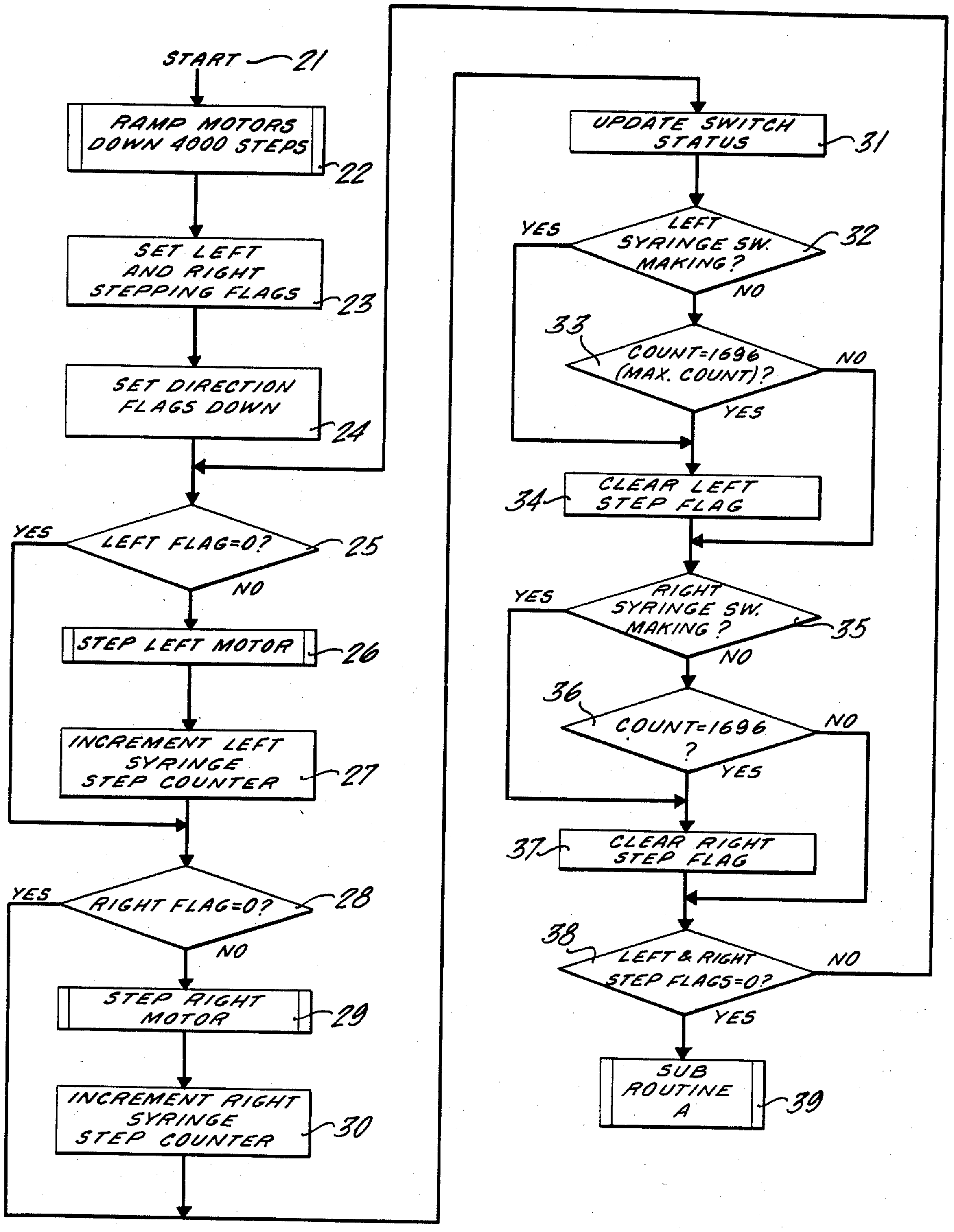
FIG. 2 is a flow chart illustrating the program control for the preferred computer control means of the invention.
Figure 3:
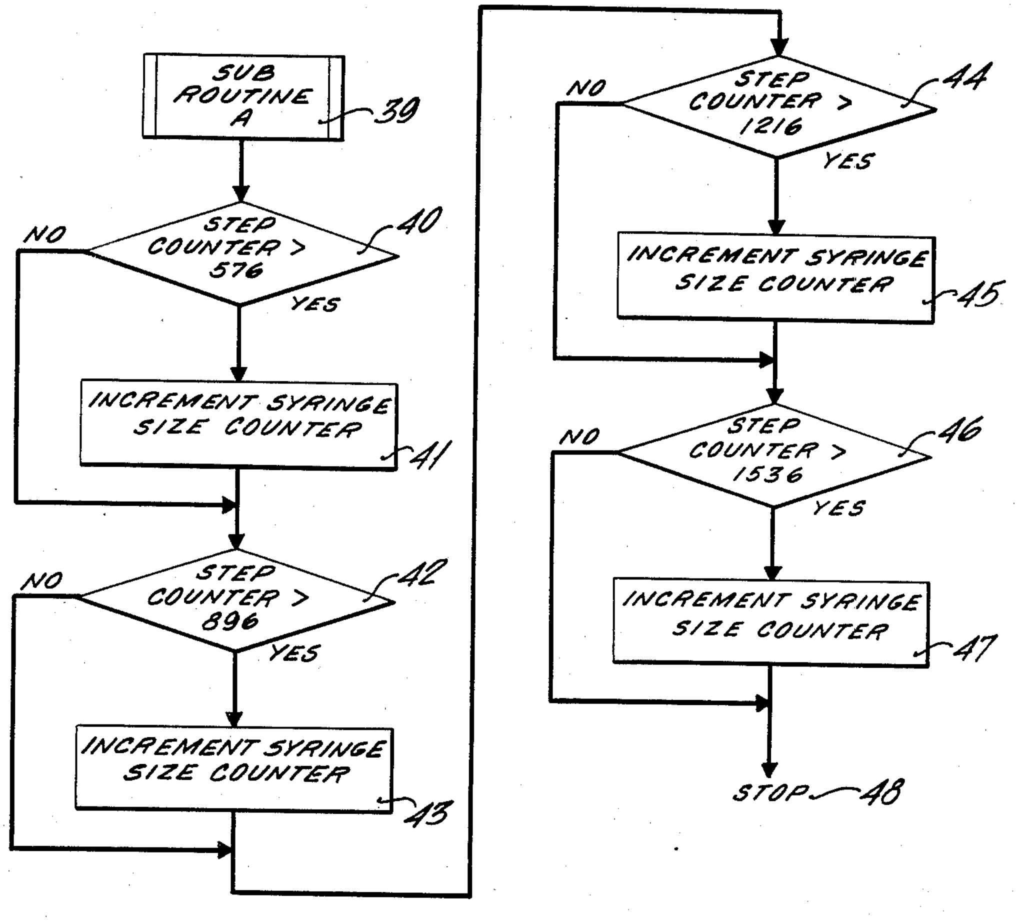
FIG. 3 is a flow chart illustrating a subroutine for the preferred program control for the computer control means of the invention.

The operation of this preferred embodiment may be further understood by reference to FIGS. 2 and 3. After at least one and preferably two of the interchangeable syringe assemblies have been installed in the automatic pipette, the operator initializes the system, as, for example, by turning the line voltage supply to the pipette ON. Alternatively, a separate INITIALIZE or RESET switch may be provided.

In the preferred embodiment, a pair of syringe assemblies are controlled simultaneously by the pipette, hereinafter referred to as RIGHT and LEFT syringe assemblies. A microprocessor senses the operator's activation of the ON, INITIALIZE or RESET switch and begins execution of a program which serves to initialize the pipette, including determination of the identity of the RIGHT and LEFT syringe assemblies. The program is outlined in the flow charts displayed in FIG. 2 and FIG. 3.

Referring now to FIG. 2, after the operator initializes the system 21 the syringe stepping motors are directed by the microprocessor to drive the syringe pistons to their maximum inward displacement and the "home" or zero switches for each of the syringes are sensed as closed by the microprocessor (not shown). Numbers 22–48 represent program steps and not elements of the apparatus. The motors are subsequently directed by the program to draw the pistons down and outward 4000 steps 22, corresponding to an axial displacement which is a large fraction of the total volume displacement of each of the syringe assemblies employed, yet which is also less than the maximum axial displacement of the smallest syringe assembly. This initial displacement is rapid and accomplished without consuming time in testing to determine if maximum outward displacement has been achieved. Two flags, which may be dedicated single bit registers within the microprocessor, other registers, or memory locations, one for each syringe assembly, are then set 23. These maximum displacement flags remain set until the syringe maximum displacement switches are made. To make a switch is to sense a change in the electrical state of the switch indicating that an event has occured. Another set of flags, direction flags indicating the direction in which each of the stepping motors is being stepped, are then set to the down position 24, indicating that the stepping motors are withdrawing the pistons from the syringe barrels. Next, the state of one of the stepping flags is checked 24 by the program to determine whether it remains set or has been cleared. If it remains set, the corresponding stepping motor is directed to step down one step 26, and the corresponding stepping counter is incremented once 27. If the flag has already been cleared, the program branches to skip the motor step and flag increment instructions. Next, the flag test 28, motor step 29, and step counter increment 30 instructions are executed for the other syringe and stepping motor. Next the status of the maximum outward displacement switches is updated 31 to reflect the current state of piston displacement. This is accomplished by first testing the status of one of maximum outward displacement switches 32. If this switch has not yet been activated by the switch activator's 8 contact with the syringe assembly adapter 5, then the corresponding syringe step increment counter is tested 33 to determine whether a maximum permissible count has been achieved. This could occur if no syringe assembly has been installed by the operator prior to initialization of the system and constitutes a fail safe protection preventing the motors from over driving the drive shafts outward in the absence of an installed syringe assembly. If the maximum outward displacement switch has been made, the program branches to skip the step increment counter test and the corresponding step flag is cleared 34. This flag is also cleared if the maximum permissible count has been achieved. When this flag has been cleared or the maximum outward displacement switch has not been made and the maximum permissible count has not been achieved, the process is repeated for the other syringe. That is, the state of the other maximum outward displacement switch is sensed 35, and the other syringe step increment counter may be tested 36 to determine whether or not the maximum permissible step count has been achieved, depending on the outcome of the switch state test 35. The other step flag may also be cleared 37. Next, the states of both of the syringe step flags are tested to determine whether they have been cleared 38. If either has not been cleared, the program branches back to repeat the step motor increment sequence 25–38. If both step flags have been cleared, indicating that both syringe pistons have been stepped either to their maximum outward displacements or that the drive shaft for either has reached its maximum downward displacement, then a subroutine 39 is called for each of the syringe assemblies in order to set a syringe size counter for each.

A flow chart outlining the operation of this subroutine is illustrated in FIG. 3. The subroutine 39 sequentially compares the contents of a syringe step counter with successively greater integers. Each of the integers is associated with a syringe assembly of known displacement used with the automatic pipette. For example, in a preferred embodiment, 576 is associated with a 20 microliter capacity syringe; 896 with 200 microliters; 1216 with 2 milliliters; 1536 with 10 milliliters; and 1696 with no syringe. If the step counter is found 40 to contain a number of greater than 576, the syringe size counter, which had been previously cleared (not shown), is incremented by one unit 41. If the step counter contents are found to be less than or equal to 576, the subroutine branches to skip the increment of the size counter. The step counter is then tested to determine whether it contains at least 896 42. If so, the size counter is incremented once again 43. If not the increment is skipped and the next test is made. The sequence of test and increment is repeated until numbers corresponding to all possible syringe volumes have been examined 44–48. When the subroutine returns control of the microprocessor to the main program the syringe size counter will contain an integer (1–4) corresponding uniquely to a syringe of previously determined volume.

This information may be used in the microprocessor in a variety of ways. For example, the microprocessor may be programmed to display the volume of each of the installed pipettes to the operator or to display an error message should a syringe assembly be found to have not been installed prior to initialization. This information may also be used to compute the syringe piston displacement required to deliver a volume called for by the operator. The information may also be used to alter the stepping motor drive parameters, for example, the motor speed and acceleration, to maximize the accuracy, precision and speed of operation of the automatic pipette depending on the size of the syringe currently installed.

The microprocessor program may be written in an assembly language, machine code, or a higher level user-oriented applications language such as BASIC, C, FORTRAN, APL, PASCAL, or PL-1. Alternatively, the program may be hard-wired. The program may be implemented on any of the variety of 8, 16 or 32 bit microprocessors known to the instrumentation art. For example, the program may be implemented for the 1600, Motorola 6800, DEC LSI-11, 6502, Z80, 8080, or 8086 series microprocessors. In addition to the microprocessor CPU itself, additional hardware required to implement the program may include: Additional RAM, ROM, or EPROM memory; input/output interfaces; input/output devices such as keyboards, displays, printers, microswitches and associated hardware and the like; analog-to-digital and digital-to-analog converters and rotary encoders and the like; and control elements such as stepper motor drivers and the like. The program outlined in FIGS. 2 and 3 may be implemented by one of ordinary skill in the computerized instrumentation art using any of a variety of hardware and software.

I claim:

1. In an automated apparatus for dispersing or diluting metered amounts of fluid having interchangeable syringe assemblies, the improvement comprising means on each of said assemblies for indicating the maximum delivery volume of each of said assemblies and means on said apparatus for automatically sensing said indicating means by said apparatus.

2. The apparatus of claim 1 wherein said syringe assemblies each comprise a barrel, a piston and an adapter, and wherein said adapter connects said piston with means for axially displacing said piston within said barrel.

3. The apparatus of claim 2 wherein a maximum axial outward displacement of said piston within said barrel indicates the effective volume of said syringe assembly.

4. The apparatus of claim 3 wherein the axial displacement of said piston is effected by stepping motor means through drive shaft means attached to said syringe assembly by said adapter.

5. The apparatus of claim 4 wherein said adapter extends in at least one direction perpendicular to the direction of axial piston displacement substantially beyond the extension of said drive shaft in said perpendicular direction such that at maximum outward displacement of said piston said adapter contacts maximum extension switch activator means.

6. The apparatus of claim 5 additionally comprising means for counting the number of steps which said stepping motor means is incremented, means for detecting maximum inward piston displacement, means for clearing said counter means at maximum inward piston displacement, means for storing maximum step numbers corresponding to syringe volumes, and means for comparing the contents of said counter means with said stored maximum step numbers.

7. The apparatus of claim 6 wherein a microprocessor controls said axial piston displacement, detects said maximum outward and inward piston displacement, stores said maximum step numbers, and compares said maximum step numbers with said contents of said counter means.

* * * * *